United States Patent [19]

Marold

[11] Patent Number: 5,802,206

[45] Date of Patent: Sep. 1, 1998

[54] METHOD FOR DETERMINING EDGE POSITIONS

[75] Inventor: Thomas Marold, Jena, Germany

[73] Assignee: Carl Zeiss Jena GmbH, Jena, Germany

[21] Appl. No.: 585,666

[22] Filed: Jan. 16, 1996

[30] Foreign Application Priority Data

Jan. 13, 1995 [DE] Germany ................ 195 00 817.0

[51] Int. Cl.⁶ .............. G06K 9/48; G06K 9/64; G06K 9/36
[52] U.S. Cl. .......................... 382/199; 382/278; 382/291
[58] Field of Search ........................ 382/199, 205, 382/291, 278; 235/462, 463

[56] References Cited

U.S. PATENT DOCUMENTS

| | | | |
|---|---|---|---|
| 4,817,174 | 3/1989 | Nakatani | 382/266 |
| 4,969,202 | 11/1990 | Groezinger | 382/199 |
| 5,144,684 | 9/1992 | Inada et al. | 382/199 |

FOREIGN PATENT DOCUMENTS

| | | |
|---|---|---|
| 0389968 | 10/1990 | European Pat. Off. . |
| PS149143 | 6/1981 | Germany . |
| PS201500 | 7/1983 | Germany . |
| 3424806 | 1/1985 | Germany . |
| 3626208 | 2/1988 | Germany . |
| 3731531 | 4/1988 | Germany . |

OTHER PUBLICATIONS

Steinbach & Weblau Bilderfassung bei einem automatischen Koordinatenmessgerat, "Wiss. Zeitschrift der TU Dresden", 1976, 4, 951–953.

Steinbach & Weblau. Das Koordinaten–und Strukturmessgerät m100, "Jenear Rundschau", 1979, 2, 84–88.

Pattern Recognition, Mike James, Chapter Three, "Grey Level Features—I Edges and Lines", 1988.

Primary Examiner—Yon J. Couso
Assistant Examiner—Ha Tran Nguyen
Attorney, Agent, or Firm—McAulay Fisher Nissen Goldberg & Kiel, LLP

[57] ABSTRACT

A method is provided for determining edge positions by evaluating digitized electrical signals which are obtained when scanning at least one light-dark structure by means of photoreceivers. The method is characterized in that the regions of four adjacent photoreceivers (i; i+1; i+2; i+3), in the middle of which is located an edge to be determined, are first determined from the signals $Y_i$, in that the type of edge, light edge, dark edge or dark-light edge or white-black transition or black-white transition is then determined from the signals $Y_i$, in that a value Mi is formed from the signals of the first two photoreceivers (i; i+1) in such a way that Mi is the extreme of $Y_i$ and $Y_{i+1}$ to be expected for the determined type of edge, in that a value Ma is formed from the signals of the two other photoreceivers (i+2; i+3) in such a way that Ma is the extreme of $Y_{i+2}$ and $Y_{i+3}$ to be expected for the determined type of edge, and in that the position x of the edge to be determined is then determined with reference to the dividing edge of the two photoreceivers i+1; i+2 in units of the photoreceiver dimensions according to the following equation:

$$x = \frac{Mi - Y_{i+1} - Y_{i+2} + Ma}{Ma - Mi}$$

6 Claims, 3 Drawing Sheets

METHOD FOR DETERMINING EDGE POSITIONS

BACKGROUND OF THE INVENTION a) Field of the Invention

The invention is directed to a method for determining edge positions in a light-dark structure by means of CCD lines or similar sensors. The method can be applied in the imaging of a coded graduation carrier on a CCD line as is effected, e.g., in digital levelling.

b) Description of the Related Art

In digital measurement processes using CCD sensors or similar discrete-scanning photoelectric sensors, it is often necessary to detect the positions of edges or light-dark transitions of an imaged structure and determine them with high accuracy.

It is known from "Wiss. Zeitschrift der TU Dresden", 25, (1976), 4, 951–953, to conduct the search for edges and structures by means of the cross-correlation function (CCF). In so doing, the CCF is formed from a portion of the image contents, e.g., the lightness function $Y_i$ of some pixels and an ideal reference edge. An edge can be determined where the CCF shows an extreme value. However, it has been shown that the form of the comparison function is not significant. For example, an ideal edge $Y'_i=(1, 1, -1, -1)$ can be taken as a comparison function, where the CCF gives $$CCF=Y_i+Y_{i+1}-Y_{i+2}-Y_{i+3},$$

e.g., for four pixels.

Thus, at an extreme value of this function an edge results in the region of pixels i+1 and i+2. In "Jenaer Rundschau", (1979), 2, 84–88, it is proposed for this purpose to balance out parabolically (quadratically) the CCF which is formed pixel by pixel in order to find the exact position of the corresponding extreme between the pixels. A disadvantage consists in the high computational effort. Further, the maximum in sharply imaged black-white transitions is very sharp so that it is questionable whether or not the parabolic adjustment will lead to optimum results, particularly when the imaging scale changes as occurs, e.g., in geodetic levelling.

In the levelling system and method according to DE-PS 34 24 806, the entire leveling staff code is used as a comparison function, which results in several disadvantages. Considerable computational effort is required since the comparison function must be prescaled corresponding to the distance indicated by a transmitter arranged at the focussing drive and a CCF maximum must be searched for in a distance region and a height region, that is, in two degrees of freedom. For this purpose, the comparison function must be scaled depending on distance and displaced according to height in each individual step until the corresponding maximum is found. Since not all bars of the code pattern can be detected, especially with greater distances, the comparison function must also be convoluted with the detector sensitivity curve in order to obtain a somewhat realistic comparison function. Since bars which increase in width as the distance increases are no longer subject to discrete detection, this missing information must be compensated for by making use of an increasingly greater portion of the code pattern for measurement. For levelling applications this means that the measured value must be obtained from a large portion of the staff graduation, which leads to problems relating to near-ground refraction.

DD-PS 201 500 discloses a method for detecting the edge position in which the integrals required for photometric determination of edge positions are determined by adding individual amplitudes of a plurality of pixels. This method is not without its disadvantages. With sharp imaging, the edge is practically located on one pixel and is only blurred or smeared with respect to diffraction, air turbulence and the modulation transmission function of the optical system employed. This means that a smearing of the edge over a plurality of pixels must be brought about by overmagnification or defocussing. In so doing, however, information is lost. A structure with a width of only two pixels cannot be resolved and accordingly can also not be interpolated. For geodetic levelling, this means a drastic reduction in the range of the measurement system.

DD-PS 149 143 describes a method for low-interference detection of teleprinter signals in which the received signals are scanned repeatedly per elemental step. In so doing, a maximum of the CCF is first searched for via four scanning values. However, the method described in this reference which is tied to a fixed base frequency cannot easily be transferred to other applications which must work with a variable imaging scale as is the case in levelling.

OBJECT AND SUMMARY OF THE INVENTION

For these reasons, the present invention has a primary object of overcoming the disadvantages inherent in the prior art methods and providing a method for determining the edge position in light-dark structures by which edge positions can be determined automatically at an accuracy of less than one pixel or receiver element with a minimum quantity of photoreceivers of a photoreceiver arrangement, also over a wide range of a variable imaging scale of the imaging optics.

In accordance with the invention, the regions of four adjacent photoreceivers, in the middle of which is located the edge to be determined, is given by a local extreme of the cross-correlation function CCF $(i)=\pm Y_i \pm Y_{i+1} \pm Y_{i+2} \pm Y_{i+3}$, where the CCF is formed from the lightness information of a quantity of photoreceivers, which can advantageously be CCD elements in a CCD arrangement, and from an ideal comparison edge. The quantity of photoreceivers is optional in principle. In the method according to the invention, four photoreceivers have proven advantageous for determining the position of the edge.

According to the inventive method, an edge of the same kind as the comparison edge is associated with a local maximum of the CCF and an edge of the opposite type with respect to the comparison edge is associated with a local minimum of the CCF. The values Mi and Ma which represent extremes and are formed from the lightness information of the CCD elements (pixels) represent a maximum or minimum depending on the type of edge. For example, when using $CCF=Y_i+Y_{i+1}-Y_{i+2}-Y_{i+3}$ for a photometrically negative image content, a maximum is associated with a black-white transition and a minimum is associated with a white-black transition. For a photometrically positive image content, a maximum is associated with a white-black transition and a minimum is associated with a black-white transition.

Thus an advantage of the method according to the invention consists in that the number of pixels made use of for interpolation will not exceed those actually located on the scanned edge. Accordingly, an error-free interpolation is possible with three pixels. The edge can even be detected with two pixels. In this case its position lies between the two pixels. Accordingly, it is possible to scan and detect code patterns or graduations of measurement staves which, when imaged in the smallest structure width, result in twice the pixel size with high accuracy and to obtain additional information on the position of the pattern in relation to the CCD lines by interpolation.

In accordance with another aspect of the invention, the regions of four adjacent photoreceivers, in the middle of which is located an edge to be determined, are given by a local extreme of a cross-correlation function, [CCF (i) $=\pm Y_i \pm Y_{i+1} \pm Y_{i+2} \pm Y_{i+3}$], which is formed from the lightness information of a quantity of photoreceivers and an ideal comparison edge.

In accordance with another aspect of the invention, wherein an edge of the same kind as the comparison edge is associated with a local maximum of the CCF and an edge of the opposite type with respect to the comparison edge is associated with a local minimum of the CCF.

The invention is explained more fully in the following with reference to an embodiment example.

DETAILED DESCRIPTION OF THE INVENTION METHOD

The determination of the edge position and interpolation of positions lying between pixels will be explained using the example of a CCD receiver comprising a photometrically negative image content of a CCD element, wherein the CCD elements are arranged in lines. Every CCD element (pixel) supplies a lightness value $Y_i$ which is defined as follows: $Y_i=0$ corresponds to "white" and $Y_i=255$ corresponds to "black", which corresponds to the 256 gray steps of an 8-bit resolution in A-D converters.

The determination of the edge positions and interpolation, respectively, are effected in a plurality of steps. First, a pixel-by-pixel search is conducted in a known manner for extreme values (maxima or minima) of the CCF which is formed from a part of the image contents, e.g., the lightness information of a quantity of photoelements or CCD elements. For this purpose, an extreme is found, e.g., for pixels i; i+1; i+2; and i+3, that is, CCF (i)=+$Y_i$+$Y_{i+1}$−$Y_{i+2}$−$Y_{i+3}$= max or min. All positive maxima are marked by a polarity flag "0" (for black-white transition) and all negative maxima (minima) are marked by a polarity flag "1" (white-black transition). This marking is reversed for a photometrically positive image content.

In another step, the following values are determined from the four lightness values of the respective CCD elements (pixels) for which the corresponding extreme (max or min) has been determined:

for a black-white transition:
Mi=Max{$Y_i$; $Y_{i+1}$}
Ma=Min{$Y_{i+2}$; $Y_{i+3}$} for a white-black transition:
Mi=Min{$Y_i$; $Y_{i+1}$}
Ma=Max{$Y_{i+2}$; $Y_{i+3}$}.

The interpolation value is now determined in another step in units of the photoreceiver dimensions or pixel size according to the following equation:

$$x = \frac{Mi - Y_{i+1} - Y_{i+2} + Ma}{Ma - Mi}$$

Figure 1:
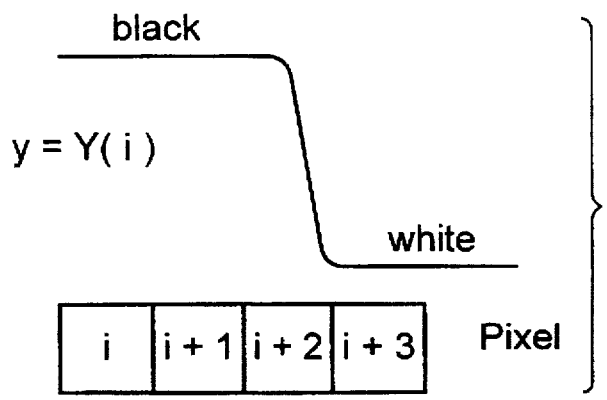
FIG. 1 illustrates an edge in the region of four pixels.

FIG. 1 shows a black-white edge in a field of four CCD elements. The CCF has a maximum for the four pixels in question so that a polarity flag "0", i.e., a black-white transition, is detected. This gives Mi=$Y_i$ and Ma=$Y_{i+3}$.

Figure 2:
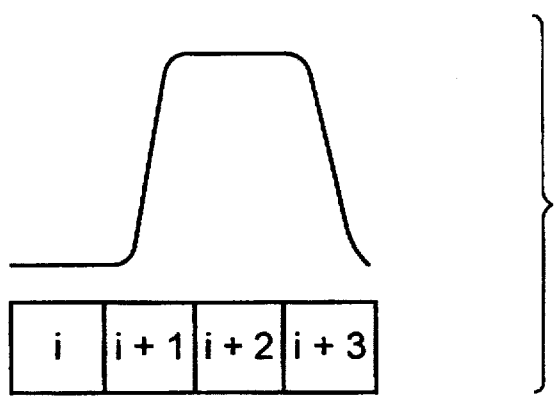
FIG. 2 illustrates an edge in the region of three pixels.

The situation illustrated in FIG. 2 is handled as follows. The CCF has a minimum (negative maximum) for the four pixels. Accordingly, the polarity flag "1", i.e., a white-black transition, is detected. According to the equations indicated above, this gives Mi=$Y_i$ and Ma=$Y_{i+2}$. Accordingly, pixel i+3 which contains the next edge is excluded for the calculation of the edge on pixel i+3. The edge on pixel i+3 would be determined in an analogous manner in another step containing the information on pixels i+1, i+2, i+3, i+4 or i+2, i+3, i+4, i+5, depending on the position of the CCF extreme.

Figure 3:
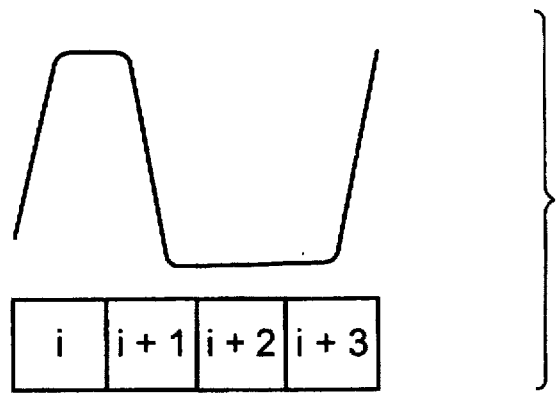
FIG. 3 illustrates an edge in the region of two pixels.
Figure 4A:
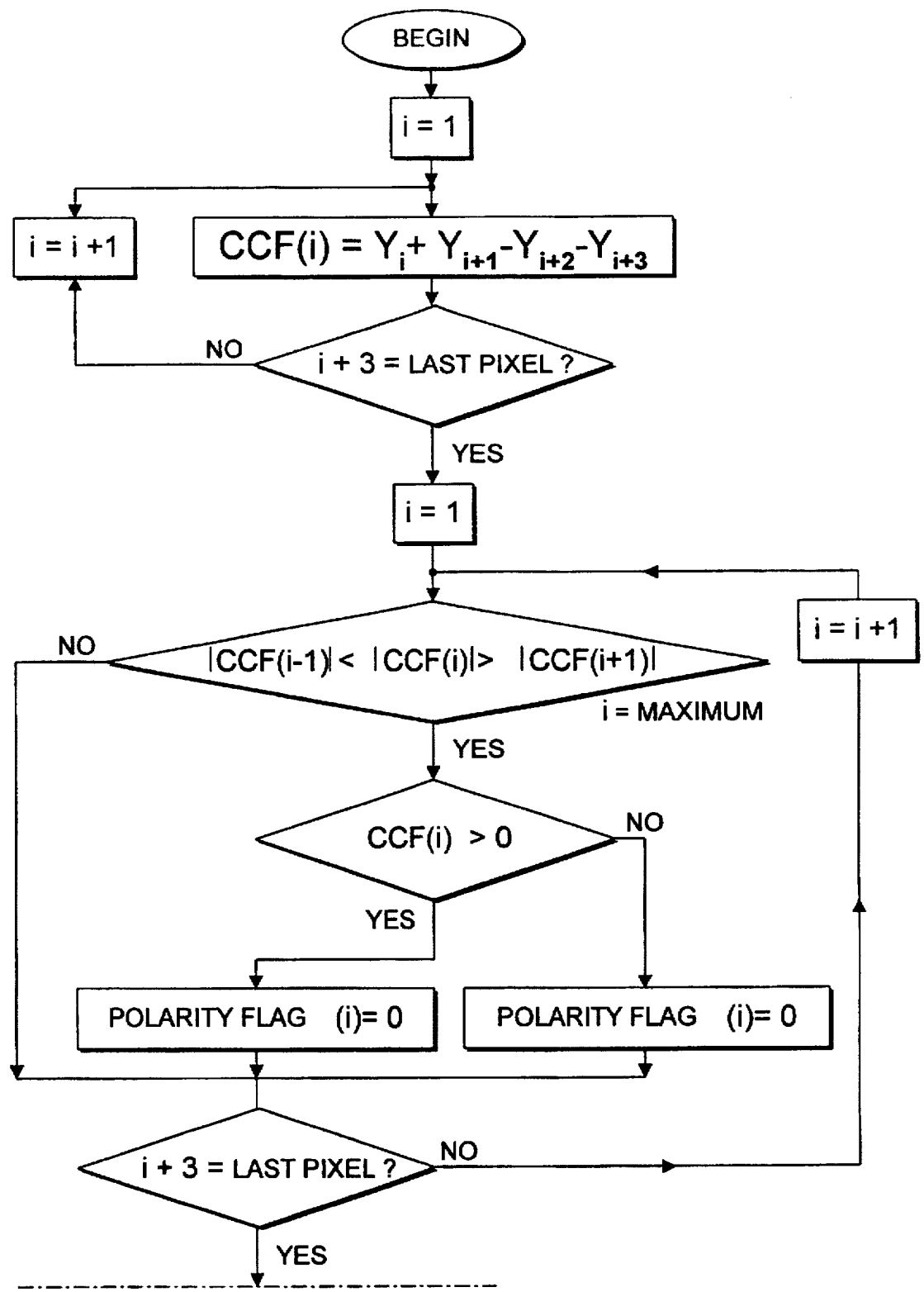
FIG. 4 illustrates a method for determining edge positions in accordance with the claimed invention.
Figure 4B:
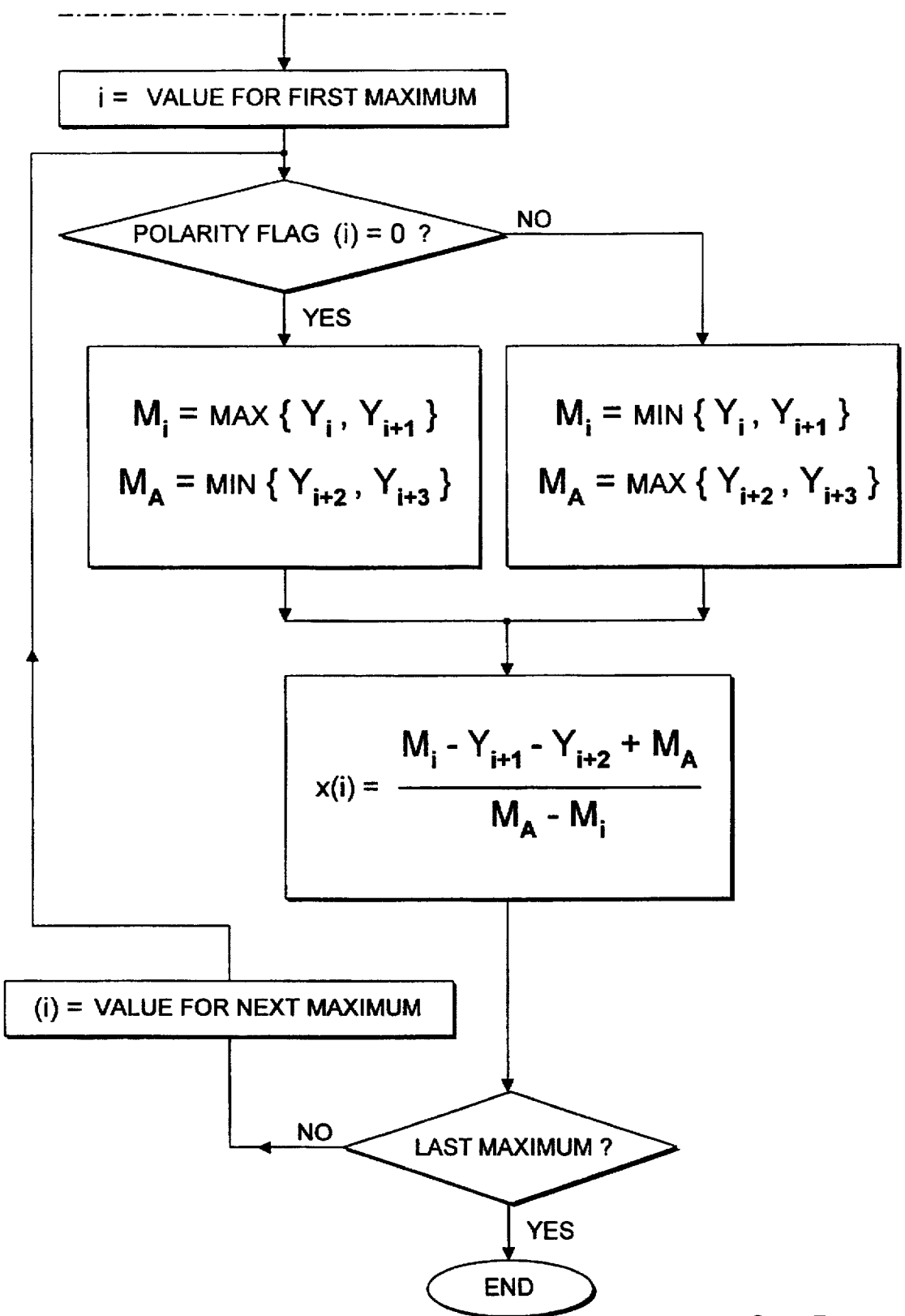

The situation illustrated in FIG. 3 would lead to a CCF maximum. The polarity flag is "0" and a black-white transition is searched for. This gives Mi=$Y_{i+1}$ and Ma=$Y_{i+2}$. In this case, the result of the interpolation is always that the edge is situated in the middle between pixels i+1 and i+2.

When the focal length of the optical system is 270 mm and the size of the utilized pixel is 14 µm, the present method can be used to reliably resolve and interpolate a graduation comprising alternating light and dark bars with a spacing of 1 cm or 1 cm and 2 cm in an optional sequence at a distance of 100 m while preserving practically all visibility conditions.

The proposed method is not limited to applications in the field of geodesy. It is applicable in practice for all structures with two polarity states (black/white, 0/1 or the like states). The structure width should amount to twice the scanning step (pixel size or magnitude of the CCD element or photoelement).

While the foregoing description and drawings represent the preferred embodiment of the present invention, it will be obvious to those skilled in the art that various changes and modifications may be made therein without departing from the true spirit and scope of the present invention.

What is claimed is:

1. In a method for determining edge positions by evaluating digitized electrical signals which are obtained when scanning at least one light-dark structure by photoreceivers, the improvement comprising the steps of:

determining an edge which is located in the middle of the regions of four adjacent photoreceivers (i; i+1; i+2; i+3), which provide lightness signals $Y_i$, $Y_{i+1}$, $Y_{i+2}$, and $Y_{i+3}$, first determining said regions from the signals $Y_i$;

determining the type of edge, light edge, dark edge or dark-light edge or white-black transition or black-white transition from the signals $Y_i$;

forming a value Mi from the lightness signals of the first two photoreceivers (i; i+1) so that Mi is an extreme of $Y_i$ and $Y_{i+1}$ to be expected for the determined type of edge;

forming a value Ma from the signals of the two other photoreceivers (i+2; i+3) so that Ma is an extreme of $Y_{i+2}$ and $Y_{i+3}$ to be expected for the determined type of edge; and determining the position x of the edge to be determined with reference to a dividing edge of the two photoreceivers i+1; i+2 in units of the photoreceiver dimensions according to the following equation:

$$x = \frac{Mi - Y_{i+1} - Y_{i+2} + Ma}{Ma - Mi}.$$

2. The method according to claim 1, wherein the regions of four adjacent photoreceivers, in the middle of which is located an edge to be determined, are given by a local extreme of a cross-correlation function (CCF)

$$CCF\ (i) = \pm Y_i \pm Y_{i+1} \pm Y_{i+2} \pm Y_{i+3},$$

which is formed from the lightness information of a quantity of photoreceivers and an ideal comparison edge.

3. The method according to claim 2, wherein an edge of the same kind as the comparison edge is associated with a local maximum of the CCF and an edge of the opposite type with respect to the comparison edge is associated with a local minimum of the CCF.

4. The method according to claim 3, wherein a maximum is associated with a black-white transition and a minimum is associated with a white-black transition for a photometrically negative image content and a $CCF = Y_i + Y_{i+1} - Y_{i+2} - Y_{i+3}$.

5. The method according to claim 3, wherein a maximum is associated with a white-black transition and a minimum is associated with a black-white transition for a photometrically positive image content and a $CCF = Y_i + Y_{i+1} - Y_{i+2} - Y_{i+3}$.

6. The method according to claim 1, including the step of using CCD elements as the photoreceivers (i; i+1; i+2; i+3).

* * * * *